(12) United States Patent
Dadario

(10) Patent No.: US 6,373,851 B1
(45) Date of Patent: Apr. 16, 2002

(54) ETHERNET BASED NETWORK TO CONTROL ELECTRONIC DEVICES

(75) Inventor: Michael Dadario, Miami, FL (US)

(73) Assignee: F.R. Aleman & Associates, Inc., Miami, FL (US)

(*) Notice: Subject to any disclaimer, the term of this patent is extended or adjusted under 35 U.S.C. 154(b) by 0 days.

(21) Appl. No.: 09/121,280

(22) Filed: Jul. 23, 1998

(51) Int. Cl.[7] .............................................. H04L 12/413
(52) U.S. Cl. ....................................... 370/445; 370/449
(58) Field of Search ................................. 370/445, 447, 370/449, 462, 465

(56) References Cited

U.S. PATENT DOCUMENTS

| | | | |
|---|---|---|---|
| 4,063,220 A | * 12/1977 | Metcalfe et al. | 340/825.5 |
| 4,712,210 A | * 12/1987 | Davis et al. | 370/296 |
| 5,210,530 A | * 5/1993 | Kammerer et al. | 340/825.5 |
| 5,854,591 A | * 12/1998 | Atkinson | 340/825.17 |

OTHER PUBLICATIONS

ANSI/IEEE Std. 802.3.

* cited by examiner

Primary Examiner—Min Jung
(74) Attorney, Agent, or Firm—J. Sanchelima; A. Bordas

(57) ABSTRACT

A data communication system wherein a network is connected to one polling server and several client stations over a relatively large area. The polling server includes a transceiver connected to the network and is capable of transmitting and receiving a data signal. The client stations are daisy chained in a network connected to said polling server and also provided with a transceiver module connected to the network and they are allowed to broadcast only when accessed by the polling server. A regeneration circuit provides the received data and control signal to its module's transmitter which is in turn presented to the adjacent client station, or vehicular traffic control device. If the module belongs to the first client station in the network, then the data and control signal will be presented to the central location's communications server.

6 Claims, 3 Drawing Sheets

ETHERNET BASED NETWORK TO CONTROL ELECTRONIC DEVICES

II. BACKGROUND OF THE INVENTION

1. Field of the Invention

The present invention relates to a wide area network (WAN), and more particularly, to such a network for the control of data processing devices that extend over a relatively large physical area using a modified carrier sense multiple access with collision detection (CSMA/CT) access method (or commonly referred to as Ethernet).

2. Description of the Related Art

Ethernet is the progeny of the standardized access methods used today, as more specifically documented in ANSI/IEEE Std. 802.3. However, due to the inherent propagation delays and characteristics of the collision detection process for independent broadcasting from each of the networked units, the application of these methods is limited to local area networks (LAN) and typically not beyond 100 feet using copper wire or typically 300 meters on fiber. Additionally, Ethernet is a peer to peer communication scheme whereby a device acquires communication privileges on a first come first serve basis. This scheme does not guarantee a device will be allowed to communicate in any given period of time.

A particularly useful application for a wide area network (WAN) is the connection of vehicular traffic control devices that are distributed over a relatively large geographical area, such as a city or a county, to a central location containing computer devices. Typically, traffic control systems communicate with the central location once every second, as a minimum. The present invention will permit the exchange of control signals to and from a polling or communications server to remote vehicular traffic control devices and in addition the more complex video signals will travel from the traffic control devices to the appropriate video signal receiving equipment. At least three thousand traffic devices can be controlled over a fiber optic network if the conventional Ethernet collision detection and random delay features are disabled until a client station is accessed. And this can be achieved at a considerable lower cost than using dedicated modems for electrical transmission over copper lines, or fiber optic communication lines.

Ethernet technology in its standard form is not acceptable as a communications scheme for traffic control systems for two main reasons. First, the peer to peer communication relationship among all of the field locations and the central location or host computer does not guarantee the exchange of data at the minimum rate expected (once per second).

Second, the maximum recommended distance for an Ethernet connection is 100 meters (328 feet) over copper lines and 2 kilometers (1.25 miles) over a fiber optic network. The present invention will permit the exchange of control signals and various other data signals from the host computer at a central location to each and every vehicular traffic control device each second regardless of the distance between the host and the vehicular traffic control device (or intersection).

A typical LAN Ethernet installation for more than one site, as shown in FIG. 1, includes a computer that acts as a server device, a hub, at least one computer workstation (two are shown in FIG. 1), communication servers (three are shown in FIG. 1) and possibly other devices (not shown). In the leftmost WAN network, two Asynchronous Transfer Mode (ATM) communication devices are connected via fiber optic cable. The ATM communication device is a conduit for multiple data paths over two fiber optic conduits, or other high speed media, among locations that are far apart. The ATM device is used to connect a remote LAN location to a central location or host computer. In this configuration the communication server sends a broadcast command to establish contact with each of the components connected to it. The communication servers include a device called an Ethernet NIC (network interface card) that provides the necessary hardware components needed to implement the Ethernet interface. In the leftmost connection shown in FIG. 1, a communication server's NIC is connected to a similar NIC housed in the ATM device. The other communication server's NIC is connected to compatible hardware in the stackable hub at the remote location. The hub sends the Ethernet frame to all workstations connected to it simultaneously. The simultaneous transmission is accomplished via the star network configuration. All of the workstations, after receiving a command will attempt transmission to the central servers, respectively. The station that is the fastest will be more likely to succeed in its transmission because it will not sense a carrier from any other device. The other workstations, when they sense a carrier of the responding workstation, start a random timer used to compute the delay for their respective next attempts to transmit. The workstation with the shortest random time delay will be the next one to transmit. This sequence will continue until all of the workstations have reported. This type of operation is referred to as peer to peer and non-deterministic communication. From time to time each server sends a broadcast command to see if any new locations have been added to the network. In addition to the broadcast situation from the server, each workstation can send data to the server or to another workstation whenever the line is not busy.

To use Ethernet technology for communications in a traffic system, the operation needs to be modified. The peer to peer relationship (non-deterministic) is made to be master-slave and deterministic. To do this the conventional Ethernet collision detection and random delay features are disabled. Through the use of special software drivers, the host computer becomes the only source of authorization for transmission from anywhere in the entire network. Only after a request for data is received does a location respond with an Ethernet frame transmission. Unlike the situation mentioned above whereby the server sends a broadcast command to learn what is connected to it, the servers used for a traffic control application will use a preprogrammed table containing the IP address of every device on the network. Whenever a new device is attached to the system, its address will be added to the table before it is connected to the network thus eliminating the need for broadcasting.

The present invention does not require the use of stackable hubs nor are the devices connected in a star configuration. A star configuration would require an enormous amount of fiber or wire to be installed and the design of hub devices that could support more locations than the ones presently available in the marketplace support. Also, the present invention includes field locations that are directly connected to the central location or host computer through a fiber optic cable or equivalent.

To present simultaneous communications to the field devices a special module was developed, as part of the present invention. The module provides for a type of drop and insert technique with two fiber receiving devices and two fiber transmitting devices on each module. Data sent from the central location or from another device in the chain is received by one or the other fiber optic receivers. Regardless of where the transmission originated, the central location or another device, it is sent to the regeneration circuit where it is passed on to other devices or back to the central location server.

When the data is received by the intended module, it is recognized and acted upon by the microprocessor. If the message demands a response, the data is assembled, the data switch is placed in the proper state, then the data is transmitted back to the central location server. This technique allows transmitted data to be passed on to other devices on a bit by bit basis. It also restores the optical power levels between devices.

One of the preferred embodiments for the present invention contemplates controlling 2,600 intersections or vehicular traffic control devices, and up to 8,192 other devices, such as, video cameras for surveillance and detection, variable message signs, highway ramp of control devices, information kiosks, etc., over more than a 750 square mile area. Control and video signals are transmitted, the latter requiring a broader bandwidth than the former. Also, future signal standards promise to be even more complex, increasing the desirability of the present invention.

One of the closest references correspond to U.S. Pat. No. 4,063,220 issued to Xerox Corp. However, it differs from the present invention in that a polling server with non-deterministic networked clients is not disclosed. The ability to simultaneously broadcast and the inherent propagation delays of the wide area network will make it impossible to use the method and apparatus disclosed by the patentee.

In fact, the patentee acknowledges the detrimental effect of using long cables for the communicating medium and thus documenting this limitation for large areas.

Other patents describing the closest subject matter provide for a number of more or less complicated features that fail to solve the problem in an efficient and economical way. None of these patents suggest the novel features of the present invention.

III. SUMMARY OF THE INVENTION

It is one of the main objects of the present invention to provide a network data communication system for communicating over a relatively large physical area permitting the connected stations to broadcast when requested by a polling communication server, thus reducing the probabilities of collisions and related delays.

It is another object of this invention to provide a high bandwidth network that permits the connected stations to transmit only when accessed by the server.

It is still another object of this invention to provide a network data communication system that is non-deterministic and its operation independent of network propagation delays.

It is still another object of this invention to eliminate the need for expensive single mode fiber optic modems that are presently used for data transmission in traffic control and other supervisory control and data acquisition (SCADA) systems.

It is yet another object to provide a system that utilizes commonly available components, such as Ethernet chip sets, to reduce the construction cost.

Another object of this invention is to port this technology onto government and privately owned copper cable plants to provide high speed communications at the cost of conventional low and medium speed modems.

IV. BRIEF DESCRIPTION OF THE DRAWINGS

With the above and other related objects in view, the invention consists in the details of construction and combination of parts as will be more fully understood from the following description, when read in conjunction with the accompanying drawings in which.

V. DETAILED DESCRIPTION OF THE PREFERRED EMBODIMENT

Figure 1:
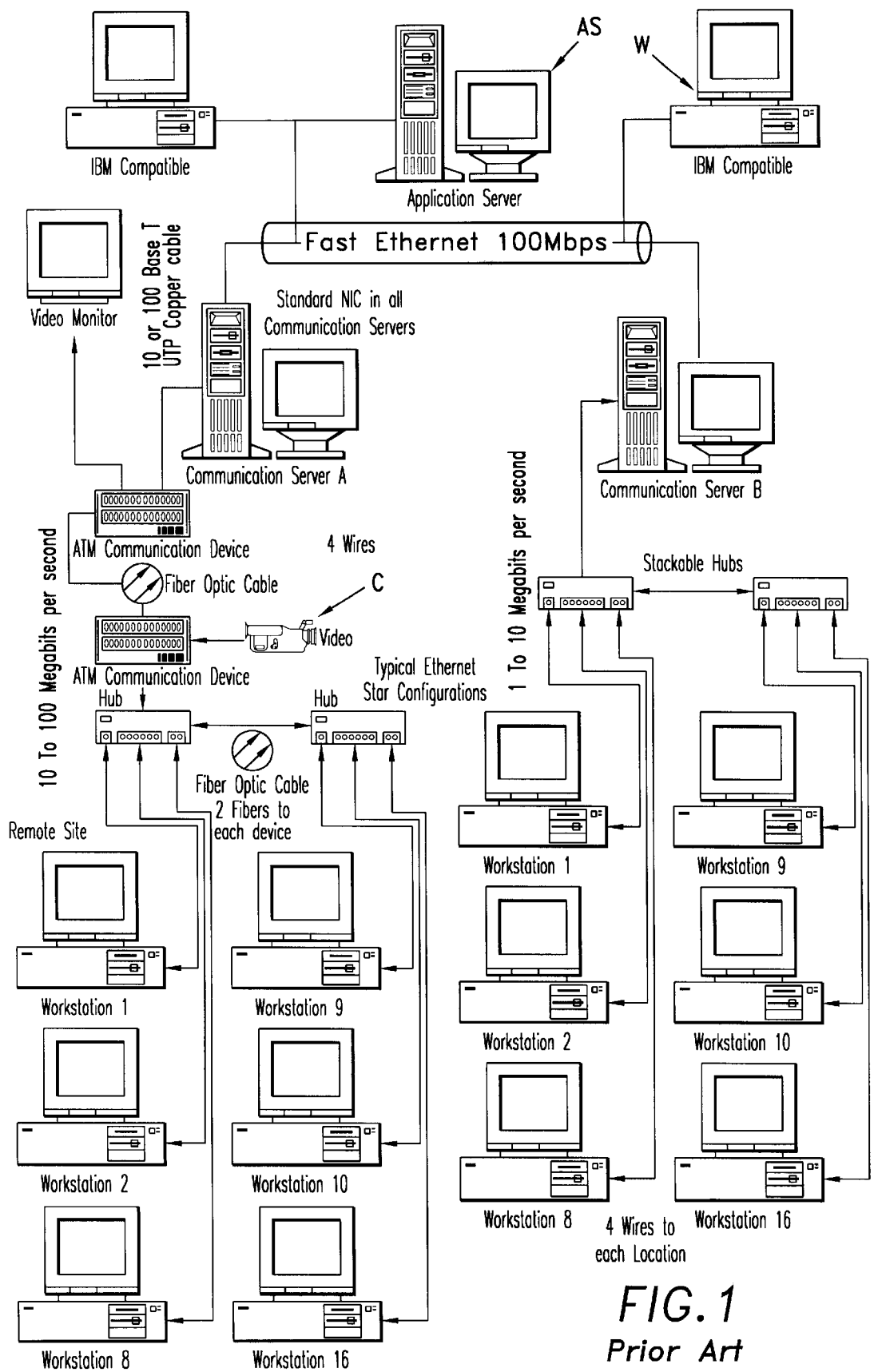
FIG. 1 represents a block diagram of a typical Ethernet LAN (local area network) installation.

FIG. 1 shows an Ethernet LAN installation configured for a site that is at some distance from the main facility or central location (such as an off campus installation in a university) and an Ethernet LAN located at the central location. The remote LAN uses fiber cable media to send and receive data and control signals. The centrally located LAN uses copper wire as a communication medium. For the remote location, communications server A sends data and control signals via ATM equipment for communications server A, or directly to the stackable hubs for communications server B. The ATM equipment supports a number of different communication schemes and equipment that simultaneously transmits and receives data, voice, and video over two fibers to the workstations. The ATM equipment includes a local ATM device and a remote ATM device. The ATM equipment functions similar to a multiplexer but with much more capability. The local ATM's Ethernet NIC is connected to a stackable hub that handles Ethernet communications among the workstations and back to the ATM equipment and then to the central location's communication server. The local Ethernet LAN server B's NIC is connected directly to a stackable hub via standard 10 Base T connectors using category 5 UTP copper wire. The hub handles the communications among the workstations and back to the server. The maximum distance that any workstation can be from the hub for the remote LAN is 2 kilometers for fiber cable and 100 meters for category 5 copper cable. The Ethernet standard calls for an approximate 52 micro second time period for responses thus creating a distance limitation. Also shown in FIG. 1 is video camera C on the remote side of the ATM equipment and a video monitor at the central location's side.

Figure 2:
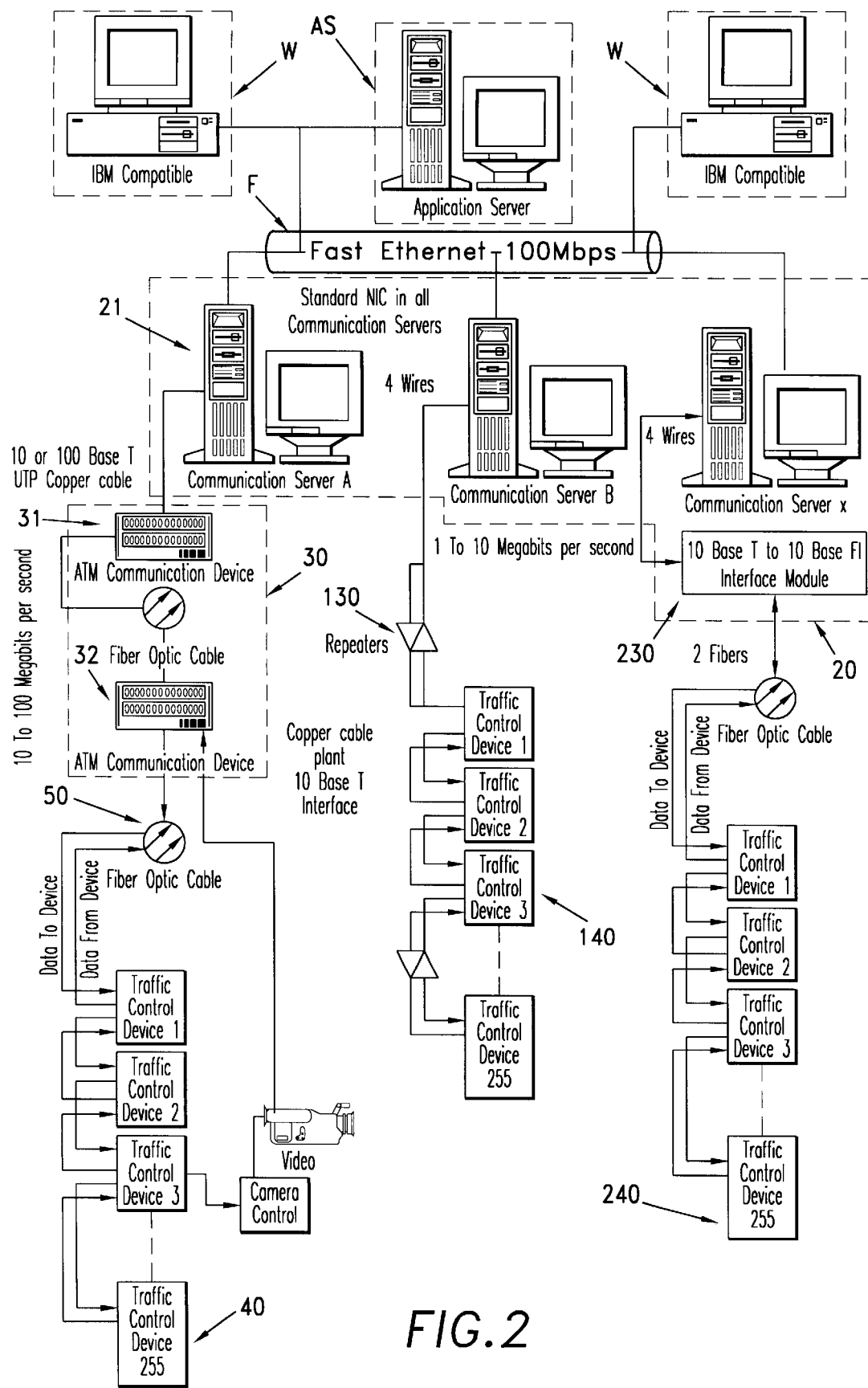
FIG. 2 represents a block diagram of the main hardware used in one of the preferred embodiments for the present invention.
Figure 3:
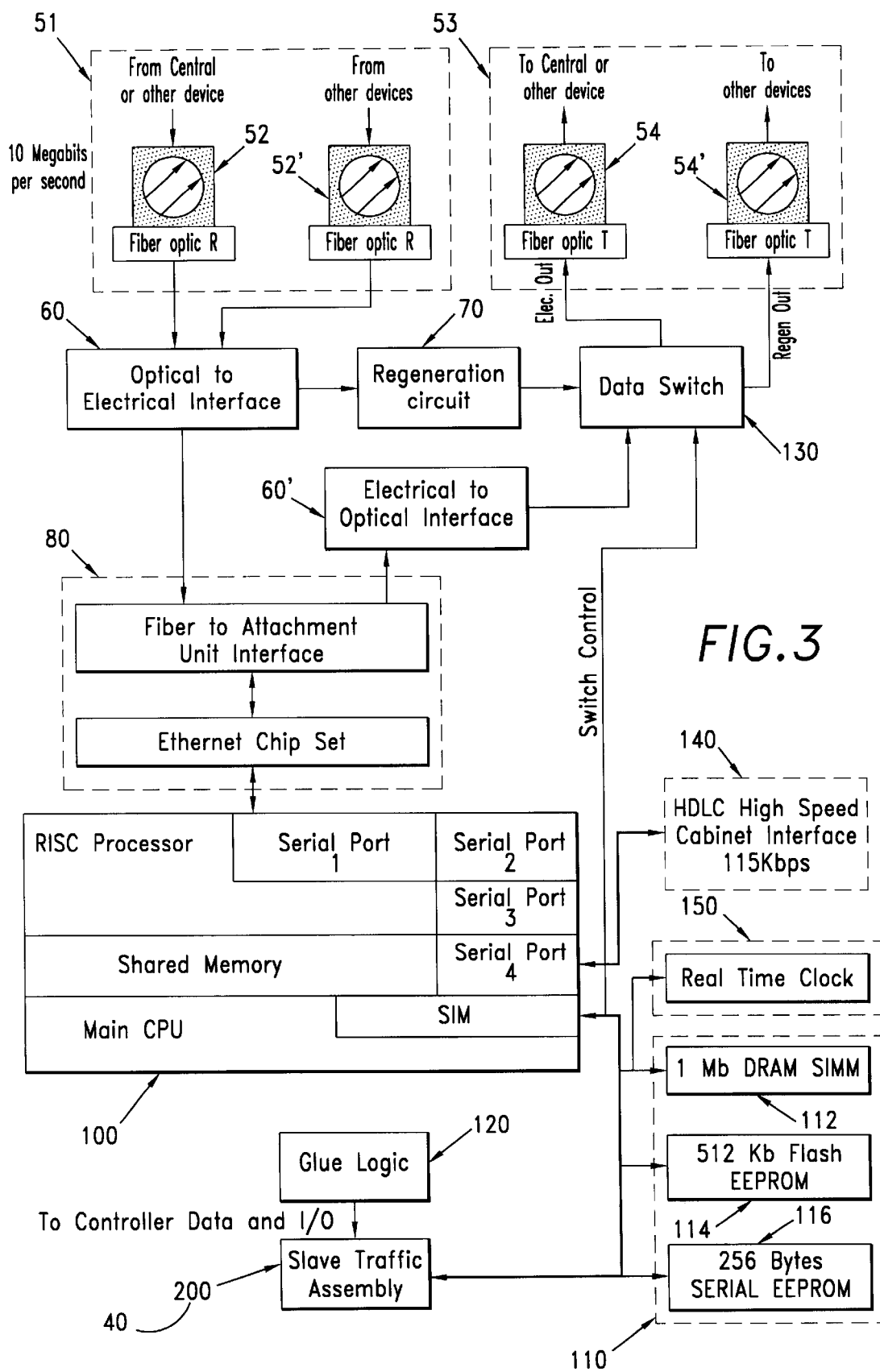
FIG. 3 shows a block diagram of the transceiver module incorporated on the vehicular traffic control stations.

FIG. 2 is a block diagram of how a network of equipment can be extended when constructed using the present invention. The centrally located computer equipment and communication servers 20 are the same as the ones shown in FIG. 1. Communications server 21 is connected, in the preferred embodiment, to a fast Ethernet network F which in turn is connected to conventional devices, such as workstations W and application server A. Three communication servers are shown in FIG. 2 to represent three different configurations supporting the connection of remotely located equipment, such as vehicular traffic control devices 40 in the preferred embodiment, to central location 20. One of the configurations being by using ATM equipment 30, the other one uses direct copper cable facilities and the third one uses a fiber optic communication medium. As in the case of server A in FIG. 1, communication server 21 is connected to central ATM device 31. Central ATM device 31 is connected to a remote ATM device 32. Remote ATM device 32 is connected to local traffic control devices 40 via module 50, as shown in FIG. 3. Unlike the equipment shown in FIG. 1, the only distance limitation is that of the fiber optic transmitters and receivers which is in excess of 15 kilometers.

Even this distance limitation can be increased with amplification, something that is not possible with conventional Ethernet protocol. Also, missing in FIG. 2, and the present invention, is the use of hub equipment as shown in FIG. 1. Therefore, the present invention has the advantage of not requiring bridge/hub equipment and, additionally, it is not handicapped by the distance limitations inherent in the collision prevention circuitry found in conventional Ethernet.

FIG. 3 is a block diagram of a module developed for installation in vehicular traffic control device 40. Transceiver module 50 contains the necessary hardware and software to interface vehicular traffic control device 40 to a fiber communication medium over which modified Ethernet protocol is transmitted for the exchange of control and data signals between centrally located computers and remotely located devices 40. Device 40 includes transceiver module 50 and slave traffic assembly 200. Module 50 can be made to interface with other communication hardware media, namely, copper, coaxial cable, wireless, etc. by changing fiber optic receivers 52; 52' and transmitters 54; 54' to devices compatible with the communication medium. Data and control signals transmitted from central location 20 or another device 40 in the chain is presented to fiber optic receivers 52 and 52' of receiver assembly 51. The first device 40 in the chain is presented with data and control signals coming from central location 20 and the adjacent device 40. Data and control signals transmitted by transmitters 54 and 54' of transmitter assembly 53 are sent, by the first device 40, to central location 20 and the adjacent device 40 in the chain. The other devices 40 will be daisy chained to each other. The optical data and control signals are converted to electronic pulses by optical to electrical interface 60 and presented to Ethernet integrated circuit 80. Then, the signals are to microprocessor circuit 100 for processing, such as validation and other functions. Optical to electrical interface 60 basically converts optical signals to electrical signals like it is conventionally done in fiber optic modems. Additionally, the received data and control signals are regenerated by regeneration circuit 70 and, through data switch assembly 130, presented to fiber optic transmitter 54'.

Microprocessor circuit 100 has associated memory assembly 110 that includes, in the preferred embodiment, 4 megabyte dynamic random access memory (DRAM) circuit 112 for storing information relating to status, events, etc., 512 Kilobyte flash electronic erasable programmable memory (EEPROM) circuit 114 for storing program steps, primarily, and 256 bytes serial electronically erasable programmable circuit 116 for storing unique identification addresses for each vehicular traffic control device 40. An HDLC (high data link control) High Speed Cabinet Interface 140 is connected to microprocessor circuit 100 to provide and gather information from other components contained in a traffic control cabinet. A real time clock circuit 150 is to provided to keep track of real time. Finally, glue logic circuit 120 provides the necessary interface compatibility to drive slave traffic assembly 200 that could be, in the preferred embodiment, a traffic light assembly or similar traffic device.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An ethernet based data communication system operating according to ethernet standards modified for use in wide area net works, comprising:
   A) a first communicating medium;
   B) an ethernet polling server including a transceiver connected to said first communicating medium that includes first transmitting means for transmitting a signal onto said first communicating medium and first receiving means for receiving a signal communicated on said first communicating medium; and
   C) a plurality of ethernet client stations daisy chained to each other in a network, each client station having a transceiver module connected to said first communicating medium, each transceiver module including second transmitting means for transmitting a signal onto said first communicating medium only upon request transmitted by said polling server, and second receiving means for receiving a signal communicated on said first communicated medium, so that collision is avoided.

2. The system set forth in claim 1 wherein said transceiver module includes signal regeneration means connected between said second receiving means and said transmitting means to simultaneously present the received signal to an adjacent client station in the chain.

3. The system set forth in claim 2 wherein said client stations include means for detecting collision that are activated only when an activation request is received by said client stations from said polling server.

4. An ethernet based data communication system operating according to ethernet standards modified for use in wide area networks, comprising:
   A) a first communicating medium;
   B) an ethernet polling server including a transceiver connected to said first communicating medium that includes first transmitting means for transmitting a signal onto said first communicating medium and first receiving means for receiving a signal communicated on said first communicating medium;
   C) an ATM assembly including local and remote ATM devices connected to each other through a second communicating medium, and said local ATM device being connected to said first communicating medium;
   D) a third communicating medium to which said remote ATM device is connected; and
   E) a plurality of client stations daisy chained to each other in a network, each client station having a transceiver module connected to said third communicating medium, each transceiver module including second transmitting means for transmitting a signal onto said third communicating medium only upon request transmitted by said polling server, and second receiving means for receiving a signal communicated on said third communicating medium so that collision is avoided.

5. The system set forth in claim 4 wherein said transceiver module includes signal regeneration means connected between said second receiving means and said transmitting means to simultaneously present the received signal to an adjacent client station in the chain.

6. The system set forth in claim 5 wherein each of said client stations include means for detecting collisions that are activated only when a request is received by said client stations.

* * * * *